(12) United States Patent
Terasaki (10) Patent No.: US 8,468,522 B2
(45) Date of Patent: Jun. 18, 2013

(54) VIRTUAL MACHINE SYSTEM, SYSTEM FOR FORCING POLICY, METHOD FOR FORCING POLICY, AND VIRTUAL MACHINE CONTROL PROGRAM

(75) Inventor: Hiroshi Terasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 404 days.

(21) Appl. No.: 12/809,285

(22) PCT Filed: Dec. 10, 2008

(86) PCT No.: PCT/JP2008/003691
§ 371 (c)(1),
(2), (4) Date: Jun. 18, 2010

(87) PCT Pub. No.: WO2009/081530
PCT Pub. Date: Jul. 2, 2009

(65) Prior Publication Data
US 2011/0154325 A1    Jun. 23, 2011

(30) Foreign Application Priority Data
Dec. 26, 2007  (JP) ................................. 2007-333472

(51) Int. Cl.
*G06F 9/455*    (2006.01)
(52) U.S. Cl.
USPC ................ 718/1; 709/206; 709/218; 709/227
(58) Field of Classification Search
None
See application file for complete search history.

(56) References Cited

U.S. PATENT DOCUMENTS

| 2007/0171921 A1* | 7/2007 | Wookey et al. ............... 370/401 |
| 2007/0174410 A1* | 7/2007 | Croft et al. ..................... 709/208 |
| 2007/0174429 A1* | 7/2007 | Mazzaferri et al. ........... 709/218 |
| 2007/0179955 A1* | 8/2007 | Croft et al. ........................ 707/9 |
| 2007/0180448 A1* | 8/2007 | Low et al. .......................... 718/1 |

FOREIGN PATENT DOCUMENTS

| JP | 5-53833 A | 3/1993 |
| JP | 2001337864 | 12/2001 |
| JP | 2003110564 | 4/2003 |
| JP | 2004287810 A | 10/2004 |
| JP | 2004306555 A | 11/2004 |

(Continued)

OTHER PUBLICATIONS

International Search Report for PCT/JP2008/003691 mailed Feb. 24, 2009.

*Primary Examiner* — Gurkanwaljit Singh (57) ABSTRACT

A virtual machine system that builds one or more virtual machines on a real machine has a hypervisor for realizing access to virtualized hardware by a guest OS that is an operating system running on the virtual machines or an application running on the guest OS by means of a physical device that the real machine has. The hypervisor includes a setting item information holding unit that holds setting item information in which a security policy is indicated by the setting value of a setting item; a setting detecting unit that monitors an instruction executed by the guest OS and the output of the physical device to detect the setting value that is set in the setting item of the setting item information holding unit or a setting value that is about to be changed therein; and a setting applying unit that, when the detected setting value and the setting value indicated by the setting item information differ from each other, applies the setting value indicated by the setting item information to the guest OS or application that is the setting target of the setting item.

12 Claims, 7 Drawing Sheets

FOREIGN PATENT DOCUMENTS

| | | |
|---|---|---|
| JP | 2004334360 A | 11/2004 |
| JP | 2005135137 A | 5/2005 |
| JP | 2006155583 A | 6/2006 |
| JP | 2007109016 A | 4/2007 |

* cited by examiner

| USER | SETTING TARGET | POLICY |
|---|---|---|
| UserA | OS(1) | PROHIBITION OF USE OF USB MEMORIES |
| | OS(2) | PROHIBITION OF USE OF EXTERNAL RECORDING MEDIA (USB MEMORIES, CD-R, ...) |
| | AP(1) | INVALIDATION OF "PRINT" MENU |
| | AP(2) | INVALIDATION OF "SAVE AS" MENU |
| UserB | OS(1) | FORCING OF HOSTS FILE |

FIG. 6

| USER | SETTING TARGET | POLICY | SETTING METHOD |
|---|---|---|---|
| UserA | OS(1) | PROHIBITION OF USE OF USB MEMORIES | REGISTRY (HKEY_LOCAL_MACHINE¥SOFTWARE¥...) |
| | OS(2) | PROHIBITION OF USE OF EXTERNAL RECORDING MEDIA (USB MEMORIES, CD-R, ..) | REGISTRY (HKEY_LOCAL_MACHINE¥SOFTWARE¥...) |
| | AP(1) | INVALIDATION OF "PRINT" MENU | AP1 SPECIAL SETTING FILE (Programfile¥AP1¥config.ini) |
| | AP(2) | INVALIDATION OF "SAVE AS" MENU | AP2 SPECIAL SETTING FILE (Programfile¥AP2¥config.ini) |
| UserB | OS(1) | FORCING OF HOSTS FILE | OS SETTING FILE (Windows¥system32¥driver¥etc¥hosts) |

FIG. 7

VIRTUAL MACHINE SYSTEM, SYSTEM FOR FORCING POLICY, METHOD FOR FORCING POLICY, AND VIRTUAL MACHINE CONTROL PROGRAM

This application is the National Phase of PCT/JP2008/003691, filed Dec. 10, 2008, which is based upon and claims priority from Japanese Patent Application No. 2007-333472 filed Dec. 26, 2007.

TECHNICAL FIELD

The present invention relates to a virtual machine system, a policy forcing system, a method for forcing a policy, and a virtual machine, control program.

BACKGROUND ART

A virtual machine system is a system that generates one or more virtual machines on a host computer that is a real machine, and enables independent operations of OSs on the respective virtual machines. Each virtual machine is run with the use of the resource of the host computer. A virtual OS operated on a virtual machine is called a guest OS.

In a conventional computer system (such as a PC) that does not use a virtual machine system, a function provided in the OS is used or a special agent is installed to force the setting of an OS or application software. Here, "forcing a policy" includes not only the act of forcibly setting a setting value according to a security policy but also the act of applying the setting value.

In recent years, attention has been drawn to a virtual machine system on which users can use OSs independently of one another. In such a virtual machine system, hardware access from each guest OS is virtualized, and actual access to a physical device is realized through a VMM. As for forcing of a policy on a guest OS and an application running on the guest OS in such a virtual machine system, Patent Document 1 discloses a machine system in which a host OS (to be more specific, a hypervisor) has a control screen to display, commands and operation conditions and the likes for a guest OS are input to the control screen, and the commands and the likes are executed by the guest OS through inputs from the host OS side.

Patent Document 2 discloses a program starting method by which the parameters of an automatic starting file and an operating environment file under the control of a guest OS are changed through an operation from the host OS side, to change the necessary operating environment (the operating environment of the guest OS) for starting an application program running on the guest OS or executing an application program under the control of the guest OS.

Patent Document 3 discloses a process monitoring system that changes devices in a plant by converting configuration data edited on a screen by a user into a data format of each device in the plant, and transmitting the converted data.

Patent Document 4 discloses a method for automatically acquiring network setting information in an information processing apparatus. Patent Document 5 discloses a method for forcibly setting a density setting parameter in a print processing apparatus.

[Patent Document 1] Japanese Laid-open patent publication NO. 2005-135137
[Patent Document 2] Japanese Published patent application A-H05-053833
[Patent Document 3] Japanese Laid-open patent publication NO. 2004-334360
[Patent Document 4] Japanese Laid-open patent publication NO. 2003-110564
[Patent Document 5] Japanese Laid-open patent publication NO. 2004-306555

DISCLOSURE OF THE INVENTION

Many business corporations today have an information processing infrastructure called the intranet, to share information within each corporation. The intranet is formed with an arbitrary number of computer systems such as servers and clients.

In a conventional computer system (such as a personal computer) that does not use a virtual machine system, a security policy (hereinafter sometimes referred to simply as a policy) is forced on an OS or an application (an application program) running on the OS by using a function prepared in the OS or installing a special agent.

In the case of a virtual machine system, however, a correct policy cannot be forced unless a special agent is installed on a guest OS, if a different setting from the policy is made on the guest OS or an application running on the guest OS on a virtual machine (the guest OS) being used by a user.

For example, if a special agent is installed in a guest OS, the contents of the setting recognized by the guest OS or an application running on the guest OS can be readily obtained, or the setting contents according to a policy can be easily changed and a notification of the change can be sent.

In the case of this method, however, it is necessary to modify the guest OS for the policy forcing. Therefore, it is preferable to force a policy on a guest OS or an application running on the guest OS, without a special agent installed in the guest OS.

The technique disclosed in Patent Document 1 aims to interlock guest OSs by automatically executing commands at the respective guest OSs. Therefore, Patent Document 1 does not teach how to manage and detect the setting corresponding to the type of each guest OS and the type of each application running on the guest OSs, and how to apply a setting change if any, to force a policy. If a policy is forced on an application running on a guest OS, for example, the application needs to restart so as to reflect the contents of the change.

Also, the program starting method disclosed in Patent Document 2 only teaches how to rewrite an automatic starting file or an operating environment file to which each guest OS refers, but does not teach how to manage and detect the setting corresponding to the type of each guest OS and the type of each application running on the guest OSs, and how to apply a setting change if any.

The techniques disclosed in Patent Documents 3 through 5 are directed to real machines. If any of the techniques disclosed in Patent Documents 3 through 5 is applied to a system directed to virtual machines, it is necessary to install a special agent in each guest OS.

To solve the above problems, the present invention aims to provide a virtual machine system, a policy forcing system, a policy forcing method, and a virtual machine control program that can force a policy on a guest OS or an application running on the guest OS, without a special agent installed in the guest OS.

According to the present invention, there is provided a virtual machine system that builds one or more virtual machines on a real machine.

This virtual machine system includes a hypervisor that realizes access to virtualized hardware by a guest OS that is an operating system running on the virtual machines or an application running on the guest OS by means of a physical device that the real machine has.

This hypervisor includes:

a setting item information holding unit that holds setting item information in which a security policy to be applied to the virtual machine system is indicated as the setting value of the setting item corresponding to the type of the guest OS or the type of the application;

a setting detecting unit that monitors the instruction executed by the guest OS and the output of the physical device, based on the setting item information, to detect the setting value that is set in the setting item of the setting item information holding unit or a setting value that is about to be changed; and a setting applying unit that, when the setting value detected by the setting detecting unit and the setting value indicated by the setting item information differ from each other, applies the setting value indicated by the setting item information to the guest OS or application that is the setting target of the setting item, with the use of hardware access from the quest OS or application.

According to the present invention, there is also provided a policy forcing system that forces a security policy on a virtual machine system that builds one or more virtual machines on a real machine.

This policy forcing system includes the virtual machine system and a management system that manages the security policy to be applied to the virtual machine system.

This virtual machine system includes a hypervisor that realizes access to virtualized hardware by a guest OS that is an operating system running on the virtual machines or an application running on the guest OS by means of a physical device that the real machine has.

This hypervisor includes:

a setting item information holding unit that holds setting item information in which the security policy to be applied to the virtual machine system is indicated as the setting value of the setting item corresponding to the type of the guest OS or the type of the application;

a setting detecting unit that monitors the instruction executed by the guest OS and the output of the physical device, based on the setting item information, to detect the setting value that is set in the setting item of the setting item information holding unit or a setting value that is about to be changed; and a setting applying unit that, when the setting value detected by the setting detecting unit and the setting value indicated by the setting item information differ from each other, applies the setting value indicated by the setting item information to the guest OS or application that is the setting target of the setting item, with the use of hardware application from the quest OS or application.

According to the present invention, there is also provided a policy forcing method for forcing a security policy on a virtual machine system that builds one or more virtual machines on a real machine.

The virtual machine system includes a hypervisor that realizes access to virtualized hardware by a guest OS that is an operating system running on the virtual machines or an application running on the guest OS by means of a physical device that the real machine has.

The policy forcing method includes:

holding setting item information in which the security policy to be applied to the virtual machine system is indicated as the setting value of the setting item corresponding to the type of the guest OS or the type of the application, the holding the setting item information being performed by the hypervisor;

monitoring the instruction executed by the guest OS and the output of the physical device, based on the setting item information, to detect the setting value that is set in the setting item of the setting item information holding unit or a setting value that is about to be changed, the monitoring the instruction and the output being performed by the hypervisor; and when the setting value detected by the setting detecting unit and the setting value indicated by the setting item information differ from each other, applying the setting value indicated by the setting item information to the guest OS or application that is the setting target of the setting item, with the use of hardware access from the quest OS or application, the applying the setting value being performed by the hypervisor.

According to the present invention, there is also provided a virtual machine control program to be executed in a virtual machine system that builds one or more virtual machines on a real machine.

The virtual machine system includes a hypervisor that realizes access to virtualized hardware by a guest OS that is an operating system running on the virtual machines or an application running on the guest OS by means of a physical device that the real machine has.

The hypervisor causes a computer to:

hold setting item information in which the security policy to be applied to the virtual machine system is indicated as the setting value of the setting item corresponding to the type of the guest OS or the type of the application;

monitor the instruction executed by the guest OS and the output of the physical device, based on the setting item information, to detect the setting value that is set in the setting item of the setting item information holding unit or a setting value that is about to be changed; and when the setting value detected by the setting detecting unit and the setting value indicated by the setting item information differ from each other, apply the setting value indicated by the setting item information to the guest OS or application that is the setting target of the setting item.

According to the present invention, a security policy can be forced on a guest OS and an application running on the guest OS, without a special agent installed in the guest OS.

BRIEF DESCRIPTION OF THE DRAWINGS

The above mentioned objects and other objects, and features and advantages of the present invention will become more apparent from the following detailed description when read in conjunction with the accompanying drawings.

BEST MODE FOR CARRYING OUT THE INVENTION

First Embodiment

Figure 1:
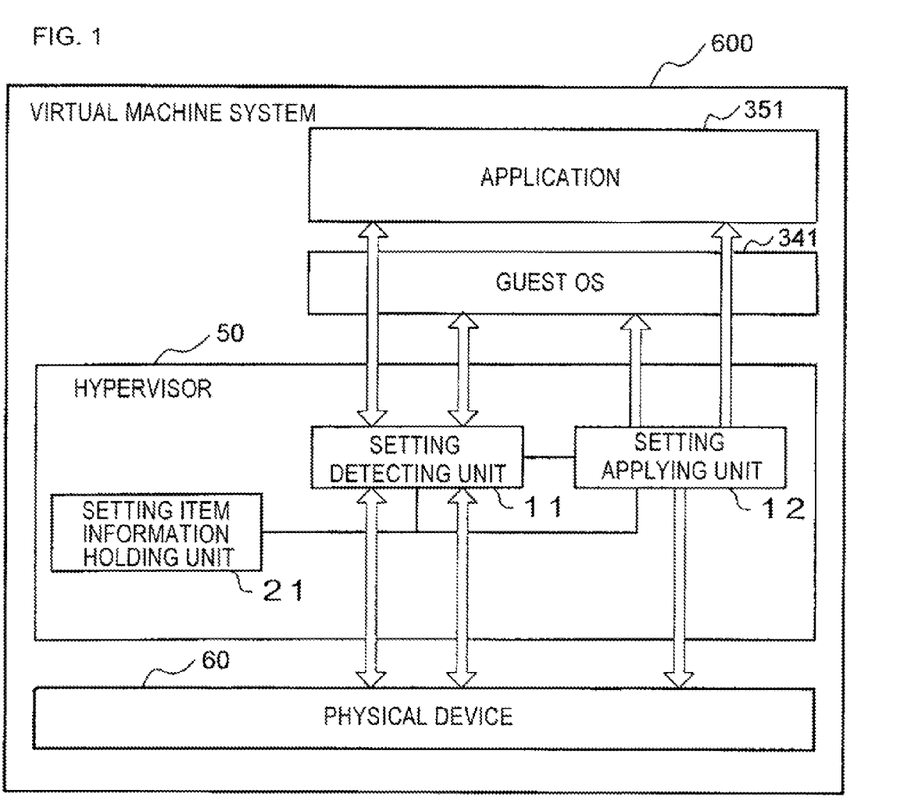
FIG. 1 is a block diagram showing a structure example of a virtual machine system according to the present invention.

The following is a description of embodiments of the present invention, with reference to the accompanying drawings. FIG. 1 is a block diagram showing a structure example of a virtual machine system 600 according to the present invention.

The virtual machine system 600 illustrated in FIG. 1 has a hypervisor 50 that realizes access to virtualized hardware by a guest OS 341 serving as an operating system running on each virtual machine or an application 351 running on the guest OS 341 by means of a physical device 60 that a real machine has.

The hypervisor 50 includes a setting detecting unit 11, a setting applying unit 12, and a setting item information holding unit 21.

The setting detecting unit 11 monitors the instruction executed by the guest OS 341 and the output from the physical device 60, based on the setting item information held by the setting item information holding unit 21. By doing so, the setting detecting unit 11 detects the setting value actually set in each setting item indicated by the setting item information or the setting value that is about to be changed.

Here, the setting item information is information in which a security policy applied to the virtual machine system 600 having this hypervisor 50 is indicated by the setting value of the setting item corresponding to the type of the guest OS 341 or the type of the application 351 running on the guest OS 341. This setting item information is held by the setting item information holding unit 21.

The setting item information holding unit 21 secures a storage area for the setting item information in an allotted storage area, and causes the secured storage area to hold a value. By doing so, the setting item information holding unit 21 holds the setting item information in the hypervisor 50 in such a manner that the setting item information can be accessed by other units.

In a case where the information indicating that the value of a predetermined registry is set at "1" is registered as the setting item for the guest OS 341 to comply with a security policy in the setting item information, the setting detecting unit 11 may check whether the information is a hardware access instruction accompanying reference to the registry, and reads the information into the physical device 60 according to the hardware access instruction, to detect the setting value that is actually set. Alternatively, the setting detecting unit 11 may monitor the hardware access accompanying updating of the registry, and refer to the updated value contained in the hardware access request, to detect the setting value that is about to be changed. The setting item is not limited to the one associated with the registry, as long as it indicates how the setting is performed according to the setting item information. For example, the setting item may be an item that is held in a setting file.

In a case where the setting value detected by the setting detecting unit 11 and the setting value indicated by the setting item information held by the setting item information holding unit 21 differ from each other, the setting applying unit 12 applies the setting value indicated by the setting item information to the guest OS 341 or the application 351 that is the setting target of the setting item, by performing one or a combination of the following operations: rewriting the response to the hardware access instruction accompanying reference or updating of the setting item from which the difference is detected; performing writing in the physical device 60 holding the setting value of the setting item; and making a notification with the use of a function of the guest OS 341 or the application 351 that is the setting target of the setting item.

The setting applying unit 12 may apply the setting value to the guest OS 341 or the application 351 that is the target of the setting item, by rewriting the response to the hardware access instruction accompanying reference or updating of the setting item from which the difference is detected, for example.

The setting applying unit 12 may apply the setting value to the guest OS 341 or the application 351 that is the target of the setting item, by making a notification with the use of a function of the guest OS 341 or the application 351 that is the target of the setting item from which the difference is detected, for example.

Alternatively, the setting applying unit 12 may apply the setting value to the guest OS 341 or the application 351 that is the target of the setting item, by performing writing in the physical device 60 holding the setting value of the setting item from which the difference is detected, for example.

As a notification made with the use of a function of the guest OS 341 or the application 351 that is the target of the setting item from which the difference is detected, the setting applying unit 12 may generate an interrupt to be received by the guest OS 341 or the application 351. Alternatively, as a notification made with the use of a function of the application 351 that is the target of the setting item, the setting applying unit 12 may generate an interrupt to be received by the application 351, via the guest OS 341 that is run by the application 351.

More specifically, in a case where a difference in the setting value of a setting item is sensed by detecting a hardware access instruction accompanying reference to the setting item, for example, the setting applying unit 12 may apply the setting value to the guest OS 341 or the application 351 that is the target of the setting item by rewriting the reference value from the physical device 60 in the response to the hardware access instruction to the setting value indicated by the setting item information.

In a case where a difference in the setting value of a setting item is sensed by detecting a hardware access instruction accompanying updating of the setting item, for example, the setting applying unit 12 may apply the setting value to the guest OS 341 or the application 351 that is the target of the setting item by rewriting the process result in the response to the hardware access instruction to a notification indicating that updating is prohibited.

In a case where a difference in the setting value of a setting item is sensed by detecting a hardware access instruction accompanying updating of the setting item, for example, the setting applying unit 12 may apply the setting value to the guest OS 341 or the application 351 that is the target of the setting item, by generating an interrupt to be received by the guest OS 341 or the application 351 that is the target of the setting item, instead of performing rewriting in the physical device 60 according to the hardware access instruction.

In the above case, even if the guest OS 341 or the application 351 that is the target of the setting item runs at the setting value, regardless of the result of the rewriting in the physical device 60, a notification can be made just like a notification made when the setting value is changed to a correct setting value by an external unit. An actual applying operation is performed through hardware access that is caused by generating an interrupt and accompanies reference to the setting item.

Figure 2:
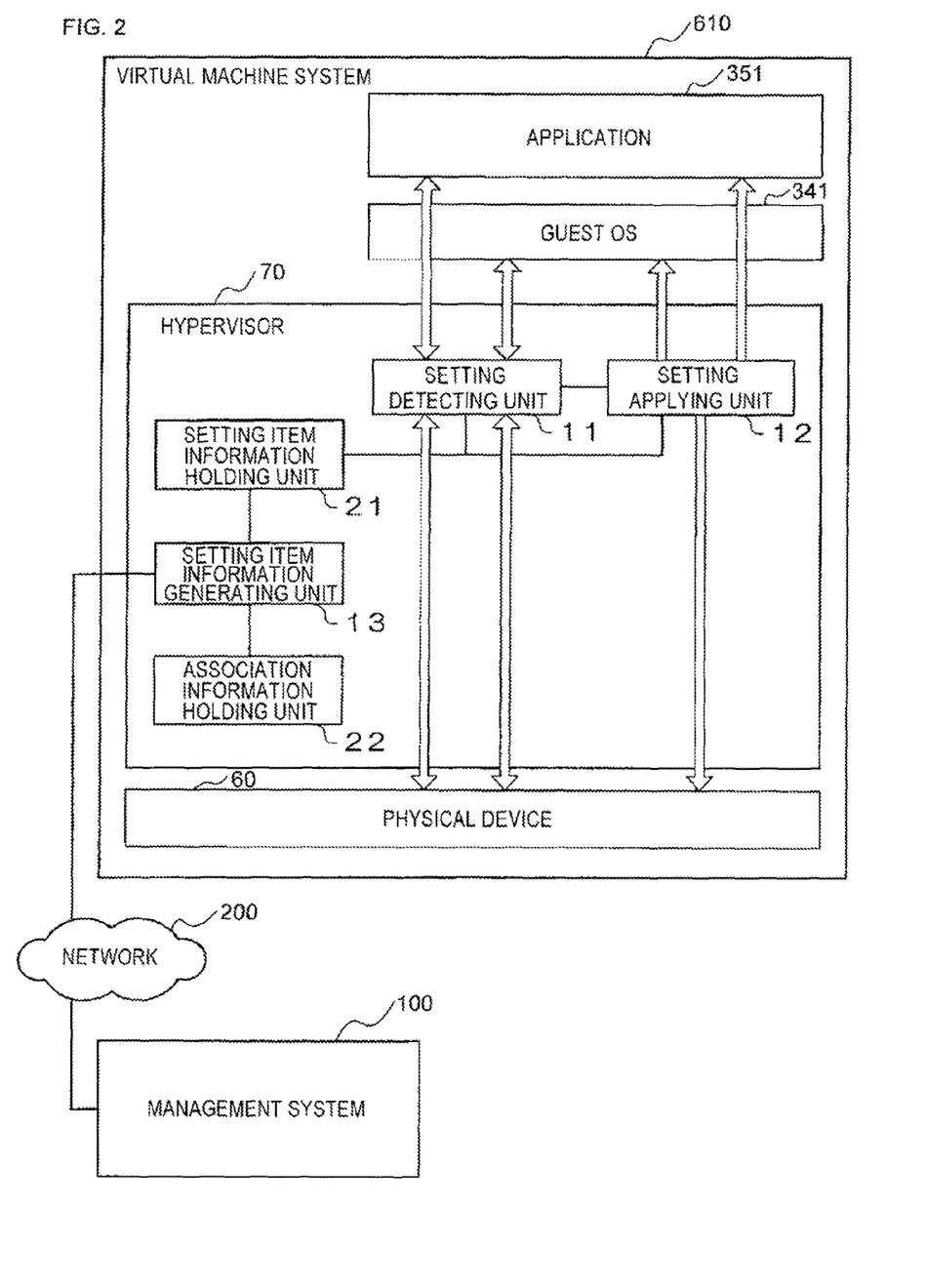
FIG. 2 is a block diagram showing another structure example of a virtual machine system according to the present invention.

The virtual machine system 600 further includes a setting item information generating unit 13 and an association information holding unit 22, as shown in FIG. 2. The virtual machine system 610 illustrated in FIG. 2 is connected to a management system 100 via a network 200.

The setting item information generating unit 13 receives information about a security policy to be applied to the virtual machine system 610 from the management system 100 managing security policies. Based on the association information held by the association information holding unit 22, the setting item information generating unit 13 develops each item of the received security policy into one or more setting values of setting items corresponding to the type of the guest OS 341 or the type of the application 351 running on the guest OS 341. By doing so, the setting item information generating unit 13 generates the setting item information.

Here, the association information is the information that indicates the associations between the respective items of security policies and the setting items of the respective types of the guest OS 341 corresponding to the items and the respective types of the application 351 running on the guest OS 341. The association information is held by the association information holding unit 22.

The association information holding unit 22 associates the information (identifiers, possible values, and the likes) about the respective items of security policies with the information (setting methods, corresponding setting values, and the likes) about the setting items of the respective types of the guest OS 341 corresponding to the items and the respective types of the application 351 running on the guest OS 341, for example.

The association information holding unit 22 secures a storage area for the association information in an allotted storage area in the hypervisor 70, and causes the secured storage area to hold a value. By doing so, the association information holding unit 22 holds the association information that can be accessed by other units, and stores the association information in the hypervisor 70, for example.

In this structure, the setting applying unit 12 holds the information about each setting item detected by the setting detecting unit 11. In a case where a difference in the setting value of a setting item is sensed through the setting item information generating unit 13 updating the setting item information, the setting applying unit 12 may apply the setting value to the guest OS 341 or the application 351 that is the target of the setting item, by writing an updated setting value into the physical device 60. If the guest OS 341 or the application 351 that is the target of the setting item has a function to sense rewriting of the physical device 60, an actual applying operation is executed by hardware access accompanying reference to the setting item performed through the automatic sensing.

For example, in a case where a difference in the setting value of a setting item is sensed through the setting item information generating unit 13 updating the setting item information, the setting applying unit 12 may apply the setting value to the guest OS 341 or the application 351 that is the target of the setting item, by generating an interrupt to be received by the guest OS 341 or the application 351 that is the target of the setting item. An actual applying operation is performed through hardware access that is caused by generating an interrupt and accompanies reference to the setting item.

Also, in a case where a difference in the setting value of a setting item is sensed through updating of the setting item information, for example, the setting applying unit 12 may apply the setting value to the guest OS 341 or the application 351 that is the target of the setting item, by writing the updated setting value into the physical device 60 and then generating an interrupt to be received by the guest OS 341 or the application 351 that is the target of the setting item.

The setting applying unit 12 holds the information that indicates which applying method should be employed for each setting item of each type of OS or each type of application, for example. Based on the information, the setting applying unit 12 performs a predetermined operation.

Also, in a case where a difference in the setting value of a setting item is sensed through updating of the information held by the setting item information holding unit 21, for example, the setting applying unit 12 may apply the setting value to the guest OS 341 or the application 351 that is the target of the setting item, by writing the updated setting value into the physical device 60.

The setting applying unit 12 may also generate an interrupt (a software interrupt) to be received by the application 351 by utilizing a function of the guest OS 341 on which the application 351 that is the target of the corresponding setting item is running, for example.

When writing is performed on the physical device 60, the setting applying unit 12 may also perform writing in the corresponding hardware region allotted as a hardware resource for the guest OS 341 or the application 351 that is the target of the corresponding setting item. For example, in a case where registry information is stored in a page pool, not only the registry information stored in the page pool but also the registry information stored in a physical memory may be rewritten, for example.

The setting detecting unit 11, the setting applying unit 12, and the setting item information generating unit 13 are realized by a processor such as a CPU that runs according to a control program for realizing hypervisor functions, to be specific. The setting item information holding unit 21 and the association information holding unit 22 are realized by storage devices such as memories allotted to the hypervisor 70, to be specific. Normally, a hypervisor is a control program for realizing hypervisor functions. In the present invention, however, the expression "a hypervisor does something" means that a processor such as a CPU performs some operation according to a control program for realizing hypervisor functions.

Figure 3:
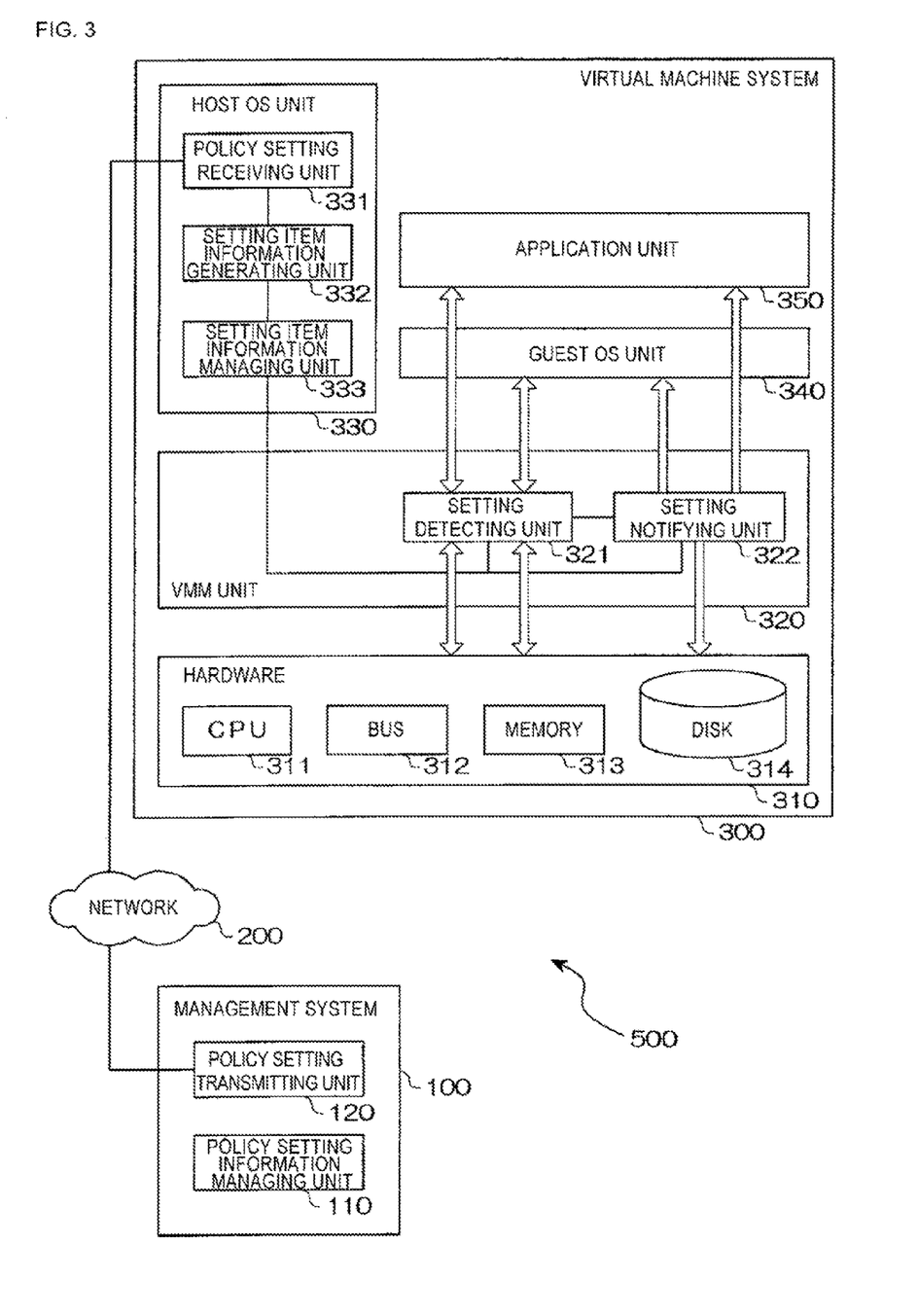
FIG. 3 is a block diagram showing a structure example of a policy forcing system according to the present invention.

Next, a more specific structure example is described. FIG. 3 is a block diagram showing a structure example of a policy forcing system 500 according to the present invention. The policy forcing system 500 illustrated in FIG. 3 is a policy forcing system that forces security policies on a virtual machine system 300, and includes a management system 100 and the virtual machine system 300. The management system 100 and the virtual machine system 300 are connected via a network 200. Although the single virtual machine system 300 is shown in FIG. 3, there may be two or more virtual machine systems 300 as the targets of security policy forcing. Alternatively, a computer system other than virtual machine systems may be included.

The management system 100 is managed by managers of a company or the like, and includes a policy setting information managing unit 10 that manages information about security policies to be applied to the virtual machine system 300 (the information will be hereinafter referred to as the policy setting information), and a policy setting information transmitting unit 120 that transmits the policy setting information to the virtual machine system 300.

More specifically, the policy setting information managing unit 110 receives settings of security policies from managers, and stores them as the policy setting information. The policy setting information managing unit 110 also requests the policy setting information transmitting unit 120 to transmit information, when there is a change in security policies. For example, the policy setting information may include the identifier for identifying the item of a security policy to be applied, and information (allowance, prohibition, or the like) about how the item is to be set. The policy setting information may also include conditions for users, conditions for OSs to be used, and the likes as the conditions for applying the setting of the item, for example.

The virtual machine system 300 includes hardware 310, a virtual machine monitoring unit 320 (hereinafter referred to as the VMM unit 320), a host OS unit 330, a guest OS unit 340, and an application unit 350.

In FIG. 3, the hardware 310 is equivalent to the physical device 60 shown in FIG. 1, and includes various physical devices. On the other hand, the VMM unit 320, the host OS unit 330, the guest OS unit 340, and the application unit 350 represent abstract processing blocks that are realized by executing programs embodying the respective functions.

For example, the VMM unit 320 represents a processing block that is realized by executing a control program (a VMM program) embodying a virtual machine monitoring function. Although being often called simply VMM, the VMM unit 320 is normally realized by a processor such as a CPU running according to a VMM program. The VMM program is driven under the control of the host OS unit 330.

The VMM unit 320 also has the function to determine the type of the guest OS unit 340 running on the virtual machine system 300 and the type of the application unit 350 running on the guest OS unit 340 by referring to a physical disk or capturing the operations of the guest OS unit 340 and the application unit 350 running on the guest OS unit 340.

The host OS unit 330 represents a processing block realized by an OS (host OS) program that is run on the real machine of the virtual machine system 300. Although being often called simply a host OS, the host OS unit 330 is realized by a processor such as a CPU operating according to the host OS program, to be specific.

For example, the VMM unit 320 and the host OS unit 330 may not be distinguished from each other, and may be mounted as a hypervisor unit that is a processing block realized by a hypervisor program that is run on the real machine of the virtual machine system 300. The hypervisor unit formed by mounting the VMM unit 320 and the host OS unit 330 that are not distinguished from each other is equivalent to the hypervisor 50 shown in FIG. 1.

The guest OS unit 340 represents a processing block realized by an OS (guest OS) program (or the guest OS 341) that is run on a virtual machine of the virtual machine system 300. The guest OS program is an operating system program to be used by users of Windows (a registered trademark), for example. Although being often called simply a guest OS, the guest OS unit 340 is realized by a processor such as a CPU running according to the host OS program, to be specific. The guest OS program is driven on a virtualized hardware resource under the control of the VMM unit 320.

The application unit 350 represents a processing block realized by an application program (or the application 351) that is run on a virtual machine of the virtual machine system 300. The application program is run on the guest OS and is used by users. The application program includes setting items unique to the application. Although being often called simply as an application, the application unit 350 is realized by a processor such as a CPU running according to the application program, to be specific. The application program is driven on a virtualized hardware resource under the control of the guest OS unit 340.

The hardware 310 includes a CPU 311, a bus 312, a memory 313, and a disk 314.

To force security policies, the VMM unit 320 includes a setting detecting unit 321 and a setting notifying unit 322.

The setting detecting unit 321 monitors the behaviors of the guest OS 341 (which can be herein regarded as the same as the guest OS unit 340) and the application 351 (which can be herein regarded as the same as the application unit 350), and detects the setting value that is actually set or the setting value that is about to be changed, with respect to each setting item corresponding to a security policy applied to the guest OS 341 running on the virtual machine system 300 and the application 351 running on the guest OS 341. Where an appropriate setting value has already been set, the setting detecting unit 321 may detect only the setting value that is about to be changed. In this example, the setting detecting unit 321 realizes the function of the setting detecting unit 11 shown in FIG. 1.

In this embodiment, the setting detecting unit 321 acquires the information about each setting item corresponding to the security policy applied to the guest OS 341 running on the virtual machine system 300 and the application 351 running on the guest OS 341, from a setting item information managing unit 333 of the host OS unit 330 that will be described later.

The setting detecting unit 321 notifies the setting item information managing unit 333 of the detected setting value.

The setting notifying unit 322 performs a notifying operation according to an instruction from the setting information managing unit 333 of the host OS unit 330, to apply the correct value of the setting item (the value according to the security policy) to the guest OS 341 or the application 351 that is the setting target of the setting item. For example, according to an instruction from the setting item information managing unit 333, the setting notifying unit 322 issues an interrupt to the guest OS 341 or the application 351 that is the setting target of the setting item, performs a writing operation on each physical device of the hardware 310, or rewrites the response to a hardware access instruction detected by the setting detecting unit 321.

In this example, the setting notifying unit 322 and the setting item information managing unit 333 realize the functions of the setting item information holding unit 21 and the setting applying unit 12 shown in FIG. 1.

To force a security policy, the host OS unit 330 includes a policy setting receiving unit 331, a setting item information generating unit 332, and the setting item information managing unit 333. The policy setting receiving unit 331 receives the policy setting information to be applied to the virtual machine system 300 from the management system 100.

The setting item information generating unit 332 converts the received policy setting information to the information about a setting item that can be recognized by the guest OS 341 and the application 351 running on the guest OS 341. More specifically, the setting item information generating unit 332 holds association information indicating the associations between each item of security policies and the setting items of each type of the guest OS 341 corresponding to the item and each type of the application 351 running on the guest OS 341. Based on the held association information, the setting item information generating unit 332 develops the setting contents of each item indicated by the received policy setting information to one or more setting values of setting items corresponding to the type of the guest OS 341 and the application 351 running on the guest OS 341. By doing so, the setting item information generating unit 332 generates the setting item information.

In this example, the setting item information generating unit 332 realizes the function of the setting item information generating unit 13 shown in FIG. 2.

In a case where the policy setting information indicates the items of a security policy applied to the virtual machine system 300 and the setting contents in XML, for example, the setting item information generating unit 332 performs an operation such as a conversion of a certain item into a registry format that can be recognized by the guest OS 341. Before performing a conversion, the setting item information generating unit 332 receives the information about the type of the guest OS 341, the type of the application 351, the installation site, and the likes, from the setting item information managing unit 333 in advance. Based on the association information and this information, the setting item information generating unit 332 determines a conversion method.

For example, for an application managing settings with the use of registries, information is converted into a registry format. For an application managing settings with the use of files, information is converted into a format that can be used on a memory.

The setting item information managing unit 333 manages the information about a setting item reading and writing to be performed by the guest OS unit 341 and the application unit 351, while managing the setting item information generated by the setting item information generating unit 332. The setting item information managing unit 333 also manages the information about the type of the guest OS 341 and the type of the application 351 running on each guest OS 341. More specifically, the setting item information managing unit 333 secures a storage area for holding the setting item information, causes the storage area to hold a value, and updates the value according to a notification from the setting item information generating unit 332.

The setting item information managing unit 333 also secures a storage area for holding the contents of the setting value of each setting item indicated by the setting item information at the guest OS 341 or the application 351, and causes the storage area to hold the setting value notified from the setting detecting unit 321. The setting item information managing unit 333 then compares the setting value at the guest OS 341 or the application 351 with the setting value according to the security policy indicated by the setting item information. When there is a difference between the setting values, the setting item information managing unit 333 issues a control instruction to the setting notifying unit 322, so as to change the setting value according to the security policy indicated by the setting item information.

Figure 4:
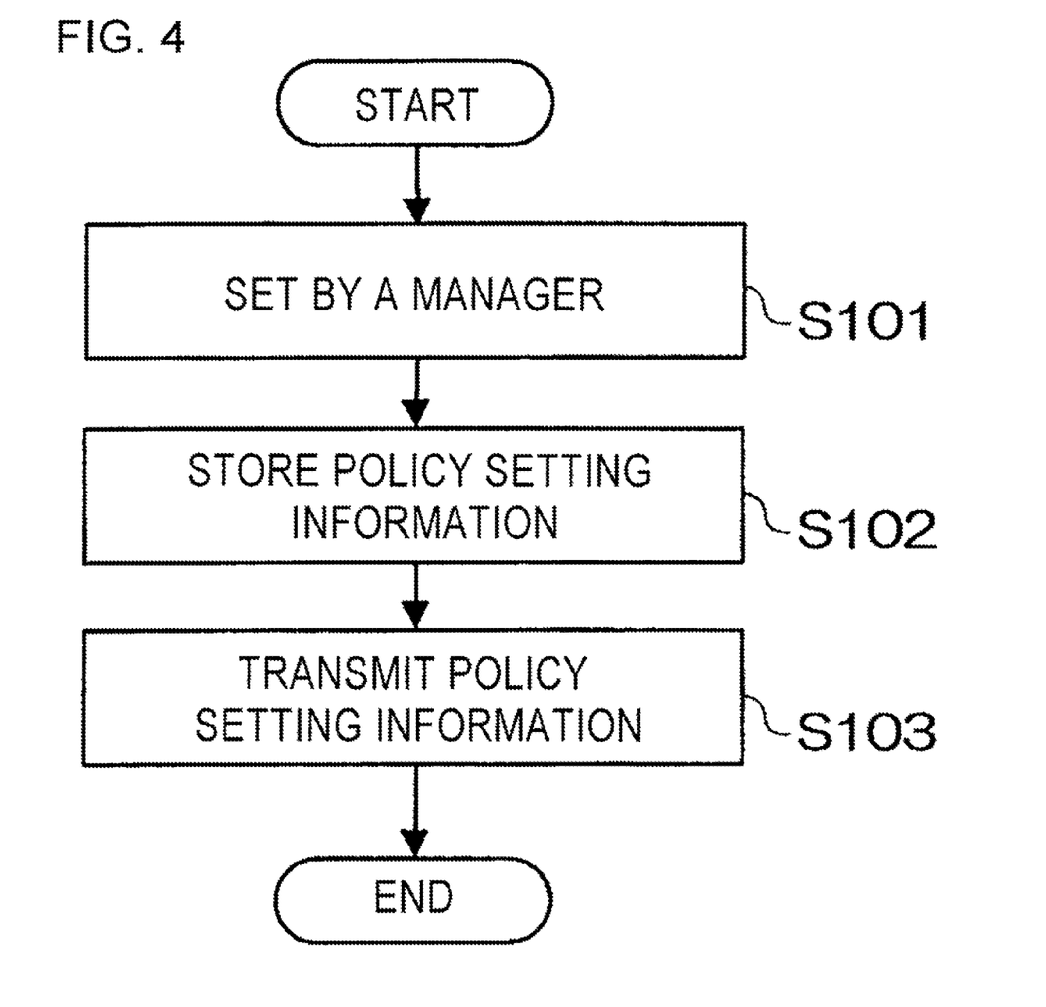
FIG. 4 is a flowchart showing an operation example of a management system according to the present invention.

Next, an operation according to this embodiment is described. FIG. 4 is a flowchart showing an operation example of the management system 100 of this embodiment. As shown in FIG. 4, when a manager sets a security policy (step S101), the policy setting information managing unit 110 (FIG. 3) stores the contents of the setting as the policy setting information to be applied to the virtual machine system 300 (step S102).

After the policy setting information is updated, the policy setting information transmitting unit 120 transmits the policy setting information to the virtual machine system 300 (step S103).

Figure 5:
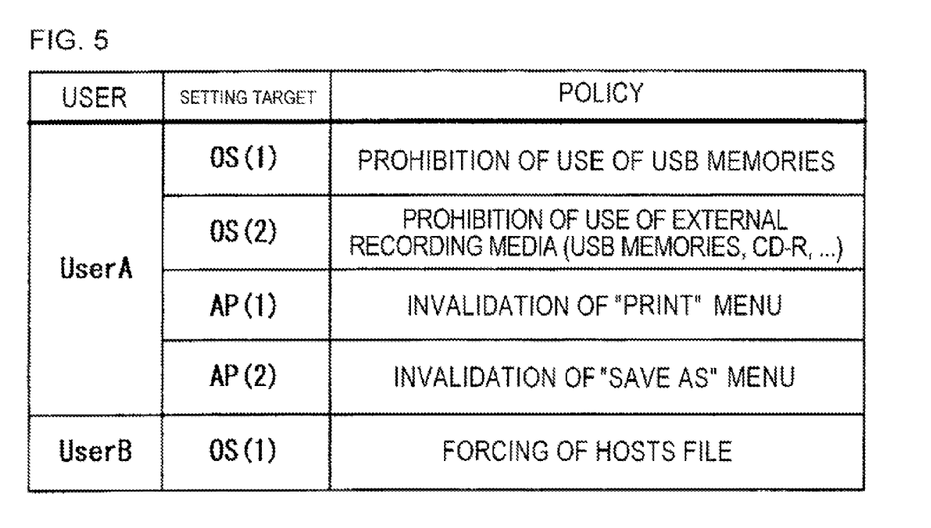
FIG. 5 is an explanatory diagram showing an example of the policy setting information that the management system according to the present invention transmits to the virtual machine system.

FIG. 5 is an explanatory diagram showing an example of the policy setting information. The policy setting information managing unit 110 may hold the setting contents of security policies in the format shown in FIG. 5, for example. In the example shown in FIG. 5, users, setting targets, and policies are associated with one another, and are listed. For example, where User A uses a particular guest OS (OS(1)), a security policy to the effect that the use of USB memories is prohibited is presented. Likewise, where User A uses a particular guest OS (OS(2)), a security policy to the effect that the use of external recording media is prohibited is presented. In an environment where a particular application (AP(1)) is installed, a security policy to the effect that the "Print" menu is invalidated is presented. In an environment where a particular application (AP(2)) is installed, a security policy to the effect that the "Save As" menu is invalidated is presented. Where User B uses the guest OS(1), a security policy to the effect that setting of Hosts file is forced is presented. FIG. 5 shows merely an example, and may include other items.

Figure 6:
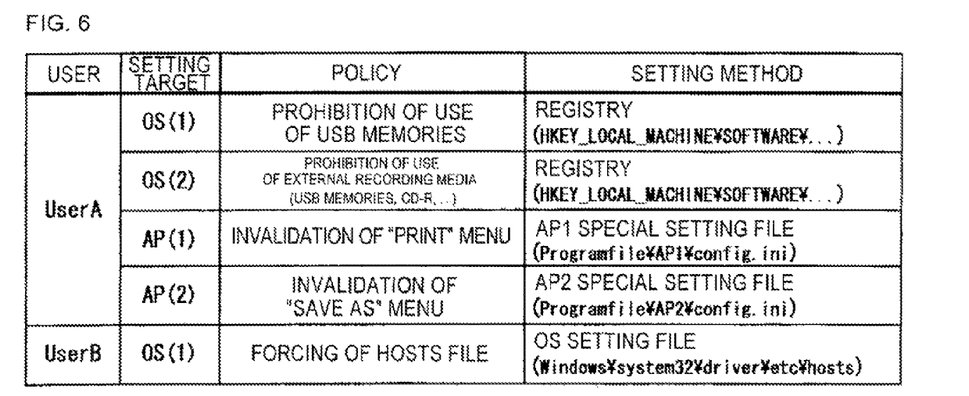
FIG. 6 is an explanatory diagram showing an example of the policy setting information combined with association information that the management system according to the present invention transmits to the virtual machine system.

For example, the association information may be incorporated into the list, as shown in FIG. 6. In the example shown in FIG. 6, users, setting targets, policies, and setting methods are associated with one another, and are listed. In FIG. 6, as a method for setting a security policy to the effect that the use of USB memories is prohibited, a setting method by which a certain registry is changed is presented, for example. As a method for setting a security policy to the effect that the use of external recording media is prohibited, a setting method by which a certain registry is changed is presented, for example. As a method for setting a security policy to the effect that the "Print" menu is invalidated, a setting method by which the special setting file of AP1 is changed is presented, for example. As a method for setting a security policy for forcibly setting the Hosts file, a setting method by which the OS setting file is changed is presented.

Figure 7:
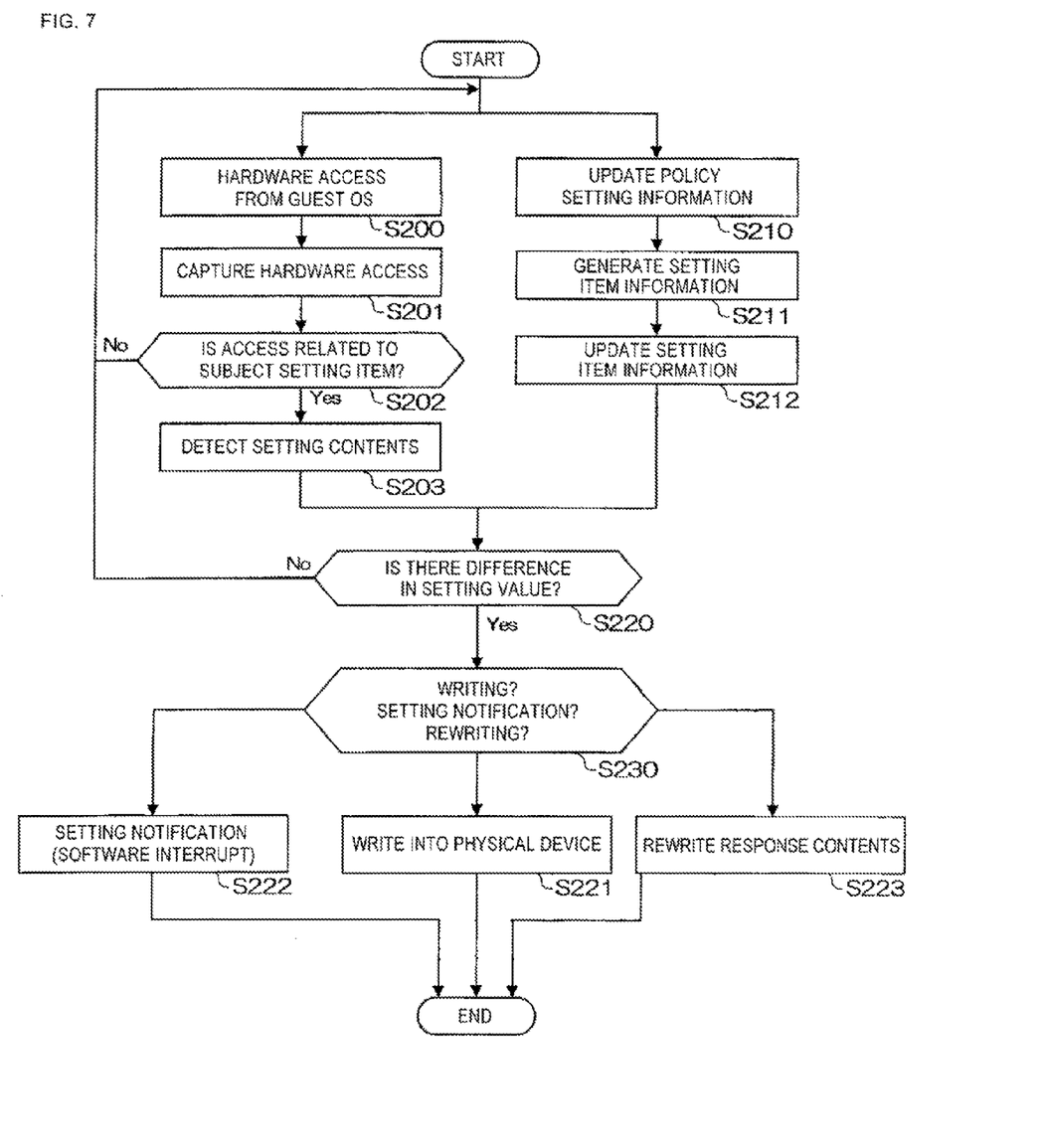
FIG. 7 is a flowchart showing an example of operations of the VMM unit and the host OS unit of the virtual machine system according to the present invention.

Next, the operations of the virtual machine system 300 are described. FIG. 7 is a flowchart showing an example of the operations of the VMM unit 320 and the host OS unit 330 in the virtual machine system 300. Referring first to steps S200 through S203 of FIG. 7, an operation related to a change of a setting item made from the guest OS unit 320 or the application unit 350 is described.

As shown in FIG. 7, when the guest OS 341 issues a hardware access instruction to store updating of a setting item according to a setting designated by a user (step S200), the VMM unit 320 captures the hardware access (step S201).

At this point, the setting detecting unit 321 determines whether the access is related to the setting item (step S202). If the access is related to the setting item ("Yes" at step S202), the setting detecting unit 321 detects the setting contents, and notifies the host OS unit 330 of the setting contents (step S203). For example, the setting detecting unit 321 detects a change made to the setting and the value of the change, and notifies the host OS unit 330 (the setting item information managing unit 333, to be more specific) of the change and the value of the change.

At step S200, if a user designates a setting for the application 351 running on the guest OS 341, the application unit 350 issues a hardware access instruction so as to store the updating of the setting item via the guest OS unit 340, for example.

If the access is not related to the setting item ("No" at step S202), hardware access or updating of the policy setting information is awaited.

Referring next to steps S210 through S212 of FIG. 7, an operation related to a change in the policy setting information made through the management system 100 is described. As shown in FIG. 7, when a security policy is set on the management system 100 and the policy setting information as the contents of the security policy is transmitted from the management system 100, the policy setting receiving unit 331 of the host OS unit 330 of the virtual machine system 300 receives the policy setting information (step S210).

As the policy setting receiving unit 331 receives the policy setting information, the setting item information generating unit 332 converts each item of the security policy indicated by the policy setting information into a setting item that can be recognized by the guest OS 341 and the application 351 running on the virtual machine system 300. By doing so, the setting item information generating unit 332 generates setting item information (step S211).

The setting item information generating unit 332 notifies the setting item information managing unit 333 of the generated setting item information, and causes the setting item information managing unit 333 to hold the setting item information. By doing so, the setting item information generating unit 332 updates the setting item information (step S212).

Referring next to steps S220 through S223 of FIG. 7, applying of a setting item is described. The setting item information managing unit 333 of the host OS unit 330 receives the contents of the setting made through the guest OS unit 340 (or the application unit 350 via the guest OS unit 340) that are notified at step S203, and the setting item information updated at step S212.

Upon receiving the contents of the setting from the guest OS unit 340 or the application unit 350, the setting item information managing unit 333 determines whether the setting value of the setting is the same as the setting value of the setting item indicated by the setting item information (or the setting value according to the security policy) (step S220). If the setting item information managing unit 333 receives the setting item information from the management system 100, the setting item information managing unit 333 updates the contents of the received setting item information, and then determines whether the setting value of each setting item indicated by the setting item information is the same as the setting value that has been set.

If a difference is found in the setting value of a setting item, the setting item information managing unit 333 causes the setting notifying unit 322 to perform a setting operation on the setting item (steps S221 through S223) through an arbitrary setting (step S230).

In a case where a setting is made so that writing is performed in the physical device 60, for example, the setting value of a setting item converted to an item that can be recognized by the guest OS 341 and the application 351 is written into the hardware 310 (a physical device) via the setting notifying unit 322 (step S221). The destination of the writing may be the data flowing through the bus 312, the data written in the memory 313, or a file written on the disk 314.

According to the present invention, in a case where a notification of an interrupt setting is made at step S230 while writing in the hardware 310 is not performed at step S221, the setting notifying unit 322 may issue a software interrupt to the guest OS 341 or the application 351 that is the setting target of the setting item (step S222), for example. To issue a software interrupt to the application 351, a predetermined software interrupt may be issued to the guest OS 341 on which the application 351 is running, so as to issue an event to the corresponding application 351 via the guest OS 341.

In any case, a notification is made by utilizing a function of the guest OS 341 or the application 351 that is the target of the corresponding setting item. For example, according to an instruction from the setting item information managing unit 333, the setting notifying unit 322 may write an interrupt CPU instruction into the CPU 311, to generate an interrupt.

According to the present invention, if a hardware access instruction is detected at step S230 while an interrupt is not generated at step S222, the response to the hardware access may be rewritten (step S223). Alternatively, the operations of steps S221 through S223 may be combined.

To make a notification of detection of a hardware instruction accompanying a setting change or a notification of updating of the setting item information, detection of a difference may be skipped, and a setting operation may be performed without condition. To make a notification of updating of the setting item information, a setting operation may be performed on two or more guest OSs 341 at once. Also, the same setting operation (rewriting of the response, writing in the physical device, and a setting notification) may be performed, regardless of the background of detection.

Figure 8:
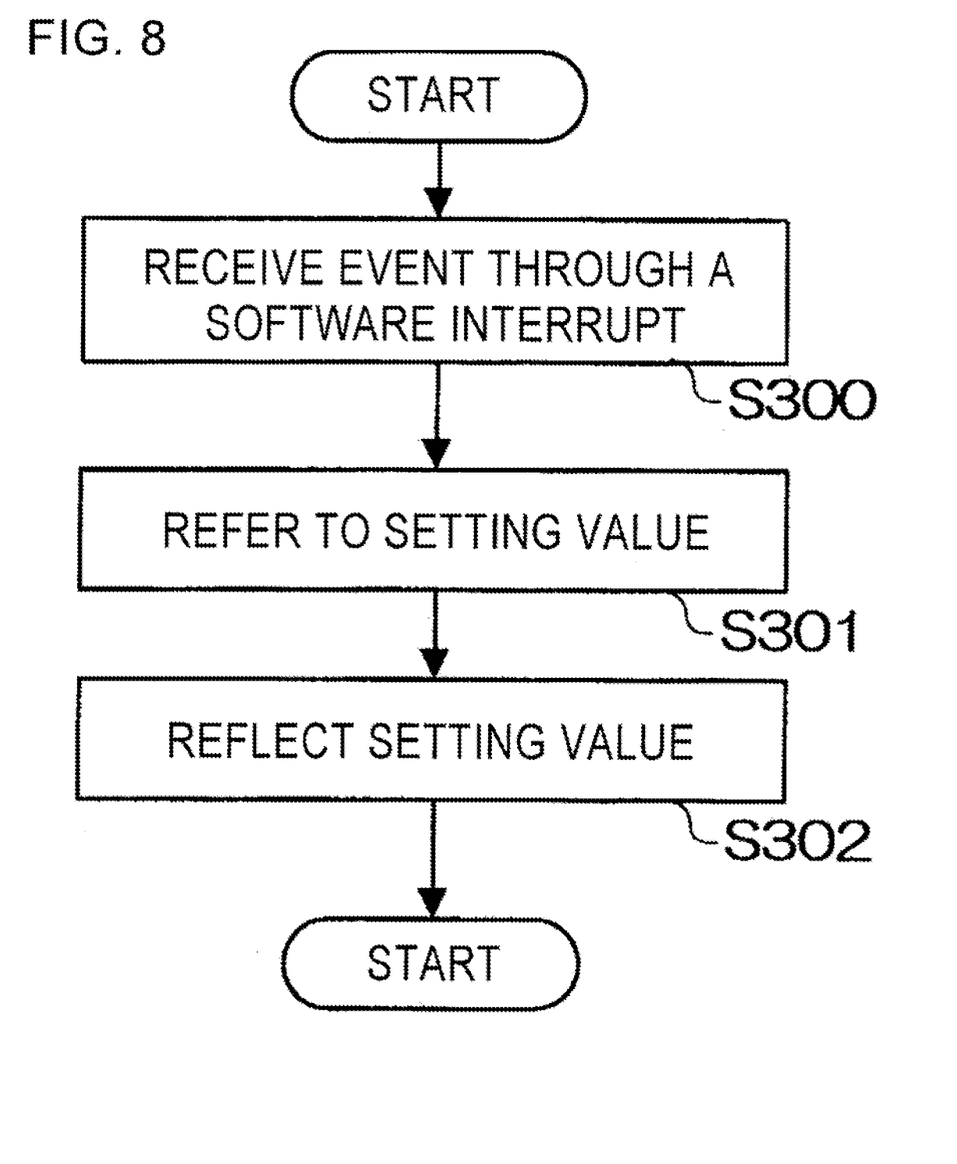
FIG. 8 is a flowchart showing an example of the operation of the guest OS unit of the virtual machine system according to the present invention.

FIG. 8 shows an example of the operation of the guest OS unit 340 in the virtual machine system 300 related to a setting operation by the VMM unit 320. FIG. 8 is a flowchart showing an example of the operation of the guest OS unit 340 related to software interrupt issuance.

As shown in FIG. 8, when a software interrupt is generated by the setting notifying unit 322, the guest OS unit 340 receives an event by virtue of the software interrupt (step S300).

Upon receiving an event caused by a software interrupt, the guest OS unit 340 reads the setting item (step S301), and reflects the read setting value in the later operations (step S302). The setting value that is read here may be the setting value that is read from the physical device into which a correct setting value is written at step S221 of FIG. 7. Alternatively, the setting value that is read here may be the setting value that is rewritten to a setting value with correct response contents at step S223 of FIG. 7 when hardware access accompanying the reference is detected.

Even where a software interrupt is not generated, a processing result indicating that updating is prohibited or has been failed should be returned as a response to a hardware instruction accompanying a change of a setting item, for example. According to the processing result, the guest OS unit 340 runs with the value of the setting item that is the value prior to the change, and the security policy is maintained.

Even if the setting target of a setting item is an application, for example, the same operations as above are performed.

As described above, according to this embodiment, a setting for the guest OS 341 or the application 351 running on the guest OS 341 can be reflected, though a special agent is not installed in the guest OS 341.

Second Embodiment

In a second embodiment of the present invention, a user that uses the guest OS 341 or the application 351 may be notified of the contents of a security policy forced on the guest OS 341 or the application 351. The structure of this embodiment is basically the same as the structure of the first embodiment.

For example, when the operations of steps S221 through S223 of FIG. 7 are carried out, a method of virtualizing a graphic sub-system should be utilized to facilitate understanding of users. More specifically, the VMM technique applied to the host processor is extended to a graphic processing unit (GPU), so as to allow hardware access to the graphic accelerator. Information about a setting change is then displayed.

With this arrangement, each user using the guest OS 341 can easily recognize a change in the setting of the guest OS 341 or the application 351 running on the guest OS 341.

Third Embodiment

In a third embodiment of the present invention, the management system 100 may include the setting item information generating unit 332. For example, the guest OS 341 and the application 351 running on the virtual machine system 300 are managed on the side of the management system 100. Based on the contents, the setting item information corresponding to the type of the guest OS 341 and the type of the application 351 can be generated on the side of the management system 100.

The present invention is not limited to the above described embodiments, and modifications and improvements that can be made within the scope of the present invention are included in the present invention.

This application is based on Japanese Patent Application No. 2007-333472, filed on Dec. 26, 2007, the entire content of which is incorporated hereinto by reference.

For example, a virtual machine system according to the present invention is a virtual machine system that builds one or more virtual machines on a real machine, and includes a hypervisor that realizes access to virtualized hardware by a guest OS that is an operating system running on each virtual machine or an application running on the guest OS by means of a physical device that the real machine has. The hypervisor includes: a setting item information holding unit that holds setting item information in which a security policy to be applied to the virtual machine system including the hypervisor is indicated by the setting value of the setting item corresponding to the type of the guest OS or the type of the application; a setting detecting unit that monitors the instruction executed by the guest OS and the output from the physical device, based on the setting item information, and detects the setting value that is actually set in the setting item or a setting value that is about to be changed; and a setting applying unit that, when the setting value detected by the setting detecting unit and the setting value indicated by the setting item information differ from each other, applies the setting value indicated by the setting item information to the guest OS or the application that is the target of the setting item, by performing one of rewriting a response to a hardware access instruction related to reference to or updating of the setting item from which the difference is detected, writing in the physical device holding the setting value of the setting item, and making a notification with the use of a function of the guest OS or application that is the target of the setting item, or performing two or more of the rewriting, the writing, and the notifying in combination.

In the virtual machine system according to the present invention, the hypervisor may include: an association information holding unit that holds association information indicating the associations between the respective items of the security policy, and the setting items of the respective types of the guest OS corresponding to the items and the application running on the guest OS; and a setting item information generating unit that generates setting item information by receiving the information about the security policy to be applied to the virtual machine system from a management system that manages the security policy, and developing the setting contents of each item of the received security policy into one or more setting values of the setting items corresponding to the type of the guest OS and the type of the application running on the guest OS, based on the held association information.

In the virtual machine system according to the present invention, the setting applying unit may rewrite the response to a hardware access instruction related to reference to or updating of the setting item from which the difference is detected, and thereby applies the setting value to the guest OS or application that is the target of the setting item.

In the virtual machine system according to the present invention, the setting applying unit may make a notification with the use of a function of the guest OS or application that is the target of the setting item from which the difference is detected, and thereby applies the setting value to the guest OS or application that is the target of the setting item.

In the virtual machine system according to the present invention, the setting applying unit May perform writing in the physical device holding the setting value of the setting item from which the difference is detected, and thereby applies the setting value to the guest OS or application that is the target of the setting item.

In the virtual machine system according to the present invention, the setting applying unit may generate an interrupt to be received by the guest OS or application, as a notification made with the use of a function of the guest OS or application that is the target of the setting item from which the difference is detected.

In the virtual machine system according to the present invention, wherein the setting applying unit may generate the interrupt via the guest OS on which the application is running, the interrupt being to be received by the application as the notification made with the use of the function of the application that is the target of the setting item.

In the virtual machine system according to the present invention, when performing writing in the physical device, the setting applying unit may perform the writing in the corresponding hardware region allotted as a hardware resource to the guest OS or application that is the target of the corresponding target item.

For example, a policy forcing system according to the present invention is a policy forcing system that forces a policy on a virtual machine system that builds one or more virtual machines on a real machine. The policy forcing system includes the virtual machine system and a management system that manages the security policy to be applied to the virtual machine system. The virtual machine system includes a hypervisor that realizes access to virtualized hardware by a guest OS that is an operating system running on the virtual machines or an application running on the guest OS by means of a physical device that the real machine has. The hypervisor includes: a setting item information holding unit that holds setting item information in which the security policy to be applied to the virtual machine system including the hypervisor is indicated by the setting value of the setting item corresponding to the type of the guest OS or the type of the application running on the guest OS; a setting detecting unit that monitors the instruction executed by the guest OS and the output from the physical device, based on the setting item information, and detects the setting value that is actually set in the setting item or a setting value that is about to be changed; and a setting applying unit that, when the setting value detected by the setting detecting unit and the setting value indicated by the setting item information differ from each other, applies the setting value indicated by the setting item information to the guest OS or application that is the target of the setting item, by performing one of rewriting a response to a hardware access instruction related to reference to or updating of the setting item from which the difference is detected, writing in the physical device holding the setting value of the setting item, and making a notification with the use of a function of the guest OS or application that is the target of the setting item, or performing two or more of the rewriting, the writing, and the notifying in combination.

In the policy forcing system according to the present invention, the hypervisor may include: an association information holding unit that holds association information indicating the associations between the respective items of the security policy and the respective types of the guest OS and the application running on the guest OS; and a setting item information generating unit that generates setting item information by receiving the information about the security policy to be applied to the virtual machine system from the management system that manages the security policy, and developing the setting contents of each item of the received security policy into one or more setting values of setting items corresponding to the type of the guest OS and the type of the application running on the guest OS, based on the held association information.

A policy forcing method according to the present invention is a policy forcing method for forcing a policy on a virtual machine system that builds one or more virtual machines on a real machine. The virtual machine system includes a hypervisor that realizes access to virtualized hardware by a guest OS that is an operating system running on the virtual machines or an application running on the guest OS by means of a physical device that the real machine has. The policy forcing method includes: holding setting item information in which the security policy to be applied to the virtual machine system including the hypervisor is indicated by the setting value of the setting item corresponding to the type of the guest OS or the type of the application running on the guest OS, the holding the setting item information being performed by the hypervisor; monitoring the instruction executed by the guest OS and the output from the physical device, based on the setting item information, to detect the setting value that is actually set in the setting item or a setting value that is about to be changed, the monitoring the instruction and the output being performed by the hypervisor; and, when the setting value detected by the setting detecting unit and the setting value indicated by the setting item information differ from each other, applying the setting value indicated by the setting item information to the guest OS or application that is the target of the setting item, by performing one of rewriting a response to a hardware access instruction related to reference to or updating of the setting item from which the difference is detected, writing in the physical device holding the setting value of the setting item, and making a notification with the use of a function of the guest OS or application that is the target of the setting item, or performing two or more of the rewriting, the writing, and the notifying in combination, the applying the setting value being performed by the hypervisor.

The policy forcing method according to the present invention may further include: holding association information indicating the associations between the respective items of the security policy and the respective types of the guest OS and the application running on the guest OS, the holding the association information being performed by the hypervisor; and generating setting item information by receiving the information about the security policy to be applied to the virtual machine system from a management system that manages the security policy, and developing the setting contents of each item of the received security policy into one or more setting values of setting items corresponding to the type of the guest OS and the type of the application running on the guest OS, based on the held association information, the generating the setting item information being performed by the hypervisor.

For example, a virtual machine control program according to the present invention is a virtual machine control program for realizing a hypervisor in a virtual machine system that builds one or more virtual machines on a real machine. The virtual machine control program causes a computer to: detect the setting value that is actually set in the setting item or a setting value that is about to be changed, by monitoring the instruction executed by the guest OS and the output from the physical device, based on setting item information in which the security policy to be applied to the virtual machine system is indicated by the setting value of the setting item corresponding to the type of the guest OS or the type of the application running on the guest OS; and, when the setting value detected and the setting value indicated by the setting item information differ from each other, apply the setting value indicated by the setting item information to the guest OS or application that is the target of the setting item, by performing one of rewriting a response to a hardware access instruction related to reference to or updating of the setting item from which the difference is detected, writing in the physical device holding the setting value of the setting item, and making a notification with the use of a function of the guest OS or application that is the target of the setting item, or performing two or more of the rewriting, the writing, and the notifying in combination.

The virtual machine control program according to the present invention may further cause the computer to: hold association information indicating the associations between the respective items of a security policy that is received from a management system that manages the security policy and is to be applied to the virtual machine system, and the respective types of the guest OS and the application running on the guest OS; and generate setting item information by developing the setting contents of each item of the received security policy into one or more setting values of setting items corresponding to the type of the guest OS and the type of the application running on the guest OS, based on the association information.

INDUSTRIAL USABILITY

The present invention can be suitably applied to cases where a setting is forced on a guest OS running on a virtual machine system or an application running on the guest OS, without a special agents installed therein.

The invention claimed is:

1. A virtual machine system that builds one or more virtual machines on a real machine, comprising
    a hypervisor that realizes access to virtualized hardware by a guest OS that is an operating system running on said virtual machines or an application running on said guest OS by means of a physical device that said real machine has,
    said hypervisor including:
        a setting item information holding unit that holds setting item information in which a security policy to be applied to said virtual machine system is indicated as a setting value of a setting item corresponding to a type of said guest OS or a type of said application;
        a setting detecting unit that monitors an instruction executed by said guest OS and an output of said physical device, and detects a candidate value, which corresponds to a setting item in the setting item information, and which is used by the instruction of the guest OS or is the output of said physical device that said real machine, on which the guest OS runs, has; and a setting applying unit that, when the candidate value detected by said setting detecting unit and the setting value corresponding to the same setting item, in said setting item information, as the candidate value differ from each other, applies not the candidate value but the setting value to said guest OS or said application that is a setting target of said setting item, using hardware access from said guest OS or said application.

2. The virtual machine system as claimed in claim 1, wherein said hypervisor includes:

an association information holding unit that holds association information indicating associations between an item defined by said security policy, and setting items of the respective types of said guest OS corresponding to the item and said application; and a setting item information generating unit that generates setting item information by receiving information about said security policy to be applied to said virtual machine system from a management system that manages said security policy, and developing setting contents of said item of said received security policy into one or more setting values of setting items corresponding to the type of said guest OS and the type of said application, based on said held association information.

3. The virtual machine system as claimed in claim 1, wherein said setting applying unit rewrites a candidate value, which is included in a response to a hardware access instruction related to reference to or updating of the setting item, to the setting value corresponding to the same setting from the setting value but, and thereby applies not the candidate value but the setting value to said guest OS or said application that is the target of said setting item.

4. The virtual machine system as claimed in claim 1, wherein said setting applying unit makes a notification with the use of a function of said guest OS or said application that is the target of the setting item when the difference between the candidate value and the setting value, which correspond to the same setting item information, is detected, and thereby applies not the candidate value but the setting value to said guest OS or said application that is the target of said setting item.

5. The virtual machine system as claimed in claim 1, wherein said setting applying unit performs writing in a physical device holding the setting value of the setting item when the difference between the candidate value and the setting value, which correspond to the same setting item in said setting item information, is detected, and thereby applies not the candidate value but the setting value to said guest OS or said application that is the target of said setting item.

6. The virtual machine system as claimed in claim 1, wherein said setting applying unit generates an interrupt to be received by said guest OS or said application, as a notification made with the use of a function of said guest OS or said application that is the target of the setting item when the difference between the candidate value and the setting value, which correspond to the same setting item in said setting item information, is detected.

7. The virtual machine system as claimed in claim 6, wherein said setting applying unit generates said interrupt via said guest OS on which said application is running.

8. The virtual machine system as claimed in claim 1, wherein, when performing writing in said physical device, said setting applying unit performs the writing in a corresponding hardware region allotted as a hardware resource to said guest OS or said application that is the target of the corresponding target item.

9. A policy forcing system that forces a security policy on a virtual machine system that builds one or more virtual machines on a real machine, comprising:

said virtual machine system; and a management system that manages said security policy to be applied to said virtual machine system, said virtual machine system including a hypervisor that realizes access to virtualized hardware by a guest OS that is an operating system running on said virtual machines or an application running on said guest OS by means of a physical device that said real machine has, said hypervisor including:

a setting item information holding unit that holds setting item information in which said security policy to be applied to said virtual machine system is indicated as a setting value of a setting item corresponding to a type of said guest OS or a type of said application;

a setting detecting unit that monitors an instruction executed by said guest OS and an output of said physical device, and detects a candidate value, which corresponds to a setting item in the setting item information, and which is used by the instruction of the guest OS or is the output of said physical device that said real machine, on which the guest OS runs, has; and a setting applying unit that, when the candidate value detected by said setting detecting unit and the setting value corresponding to the same setting item, in said setting item information, as the candidate value differ from each other, applies not the candidate value but the setting value to said guest OS or said application that is a setting target of said setting item, using hardware access from said guest OS or said application.

10. The policy forcing system as claimed in claim 9, wherein said hypervisor includes:

an association information holding unit that holds association information indicating associations between an item defined by said security policy and setting items of the respective types of said guest OS corresponding to the item and said application; and a setting item information generating unit that generates setting item information by receiving information about said security policy to be applied to said virtual machine system from said management system that manages said security policy, and developing setting contents of said item of said received security policy into one or more setting values of setting items corresponding to the type of said guest OS and the type of said application, based on said held association information.

11. A policy forcing method for forcing a security policy on a virtual machine system that builds one or more virtual machines on a real machine, said virtual machine system including a hypervisor that realizes access to virtualized hardware by a guest OS that is an operating system running on said virtual machines or an application running on said guest OS by means of a physical device that said real machine has, said policy forcing method, which is performed by said hypervisor, comprising:

holding setting item information in which said security policy to be applied to said virtual machine system is indicated as a setting value of a setting item corresponding to a type of said guest OS or a type of said application;

monitoring an instruction executed by said guest OS and an output of said physical device detecting a candidate value, which corresponds to a setting item in the setting item information, and which is used by the instruction of the guest OS or is the output of said physical device that said real machine, on which the guest OS runs, has; and when the candidate value detected by said setting detecting unit and the setting value corresponding to the same setting item, in said setting item information, as the candidate value differ from each other, applying not the candidate value but the setting value to said guest OS or said application that is a setting target of said setting item, using hardware access from said guest OS or said application.

12. The policy forcing method as claimed in claim 11, further comprising:

holding association information indicating associations between an item defined by said security policy and setting items of the respective types of said guest OS corresponding to the item and said application; and generating setting item information by receiving information about said security policy to be applied to said virtual machine system from a management system that manages said security policy, and developing setting contents of said item of said received security policy into one or more setting values of setting items corresponding to the type of said guest OS and the type of said application, based on said held association information.

* * * * *